United States Patent [19]

Kremer

[11] Patent Number: 4,989,832
[45] Date of Patent: Feb. 5, 1991

[54] VALVE ARRANGEMENT FOR FILLING AND EMPTYING A GAS CONTAINER

[75] Inventor: Paul Kremer, Walferdange, Luxembourg

[73] Assignee: Ceodeux S.A., Lintgen, Luxembourg

[21] Appl. No.: 446,844

[22] Filed: Dec. 6, 1989

[30] Foreign Application Priority Data

Dec. 6, 1988 [LU] Luxembourg ............................ 87400

[51] Int. Cl.⁵ ........................................................ F16K 31/00
[52] U.S. Cl. ........................................ 251/291; 251/254; 251/263; 222/509
[58] Field of Search ............... 251/128, 254, 263, 251, 251/89.5, 339, 291

[56] References Cited

U.S. PATENT DOCUMENTS

| | | | |
|---|---|---|---|
| 1,070,624 | 8/1913 | Payne | 251/254 |
| 1,241,989 | 10/1917 | Kelly | 251/254 |
| 1,693,720 | 12/1928 | Lyons | 222/509 |
| 3,220,695 | 11/1965 | Downey et al. | 251/263 |
| 4,133,345 | 1/1979 | Mitchell | 251/339 |
| 4,449,545 | 5/1984 | Vernon et al. | 251/149.9 |
| 4,586,634 | 5/1986 | Minter et al. | 222/509 |

FOREIGN PATENT DOCUMENTS

| | | |
|---|---|---|
| 298181 | 4/1972 | Fed. Rep. of Germany . |
| 2909046 | 8/1986 | Fed. Rep. of Germany . |
| 271168 | of 1927 | United Kingdom ................ 251/128 |

Primary Examiner—A. Michael Chambers
Attorney, Agent, or Firm—Leydig, Voit & Mayer

[57] ABSTRACT

The valve has a residual pressure valve (14) which is known per se, in which however the gas container can be filled through the residual pressure valve. The residual pressure valve (14) is mounted on a stem (32) which is axially displaceable as a result of a cam configuration in such a manner that it assumes a stable operating position under the influence of its spring (24) and an unstable open position under manual action on a filling apparatus (52) counter to the influence of its spring (24).

12 Claims, 2 Drawing Sheets

VALVE ARRANGEMENT FOR FILLING AND EMPTYING A GAS CONTAINER

The invention relates to a valve arrangement for filling and emptying a gas container, in particular a container for high-purity gases, having a residual pressure valve and a filling apparatus which is mounted on the residual pressure valve for carrying out the filling process.

It is known to equip gas containers for high-purity gases, which are used, for example, in the manufacture of optical fibers or the manufacture of semi-conductors, in particular for doping the latter, with a so-called residual pressure valve, the purpose of which is to close automatically during emptying of the container when the container pressure has reached a predetermined minimum value, the residual pressure, which lies above the ambient pressure. In this way, the penetration of impurities from the ambient atmosphere into the container is rendered impossible.

In order to fill up the gas container again, the said residual pressure valve must of course be opened, which can be effected either manually or, alternatively, automatically as a result of the pressure of the fresh gas.

Known manual actuations of the residual pressure valve have the disadvantage that they can be inadvertently left open after completion of the filling process, so that, when gas is subsequently removed, the container can empty as far as the ambient pressure, with the resultant abovementioned risks of penetration of impurities from the ambient atmosphere.

There are also known filling apparatuses which, when mounted on the residual pressure valve for the purpose of carrying out a filling process, open the residual pressure valve mechanically and automatically and, when dismounted, enable the residual pressure valve to close under the action of a pressure spring associated therewith (see German patent Specification 2,909,046 C2). However, this filling apparatus is of relatively complicated design and has in particular a fairly long axial overall length. In a variant, having a reduced overall length, of this apparatus according to the said patent specification, however, an automatic opening and closing of the residual pressure valve is no longer obtained, with the ensuing disadvantages.

German Patent Specification 3,013,102 C2 describes a filling apparatus which works on the principle of a pneumatic double diameter piston and also functions fully automatically. Owing to the presence of pneumatic components, which naturally have to be precision parts, this apparatus is not only relatively complicated but also expensive in terms of manufacture and materials.

In order to avoid this and other disadvantages of the valve arrangements for filling and emptying a gas container according to the prior art, it is the object of the invention to propose such an arrangement according to the generic type mentioned at the beginning, which allows the residual pressure valve to open using the filling apparatus in order to carry out a filling process and ensures that the residual pressure valve closes automatically when the filling apparatus is removed.

This object is achieved by virtue of a valve arrangement for filling and emptying a gas container of the generic type mentioned at the beginning, having the features listed in the characterizing clause of the main claim.

An exemplary embodiment of the invention is illustrated in the drawings, in which like parts are given like reference numerals, and is described in greater detail below. In the drawings.

Figure 1:
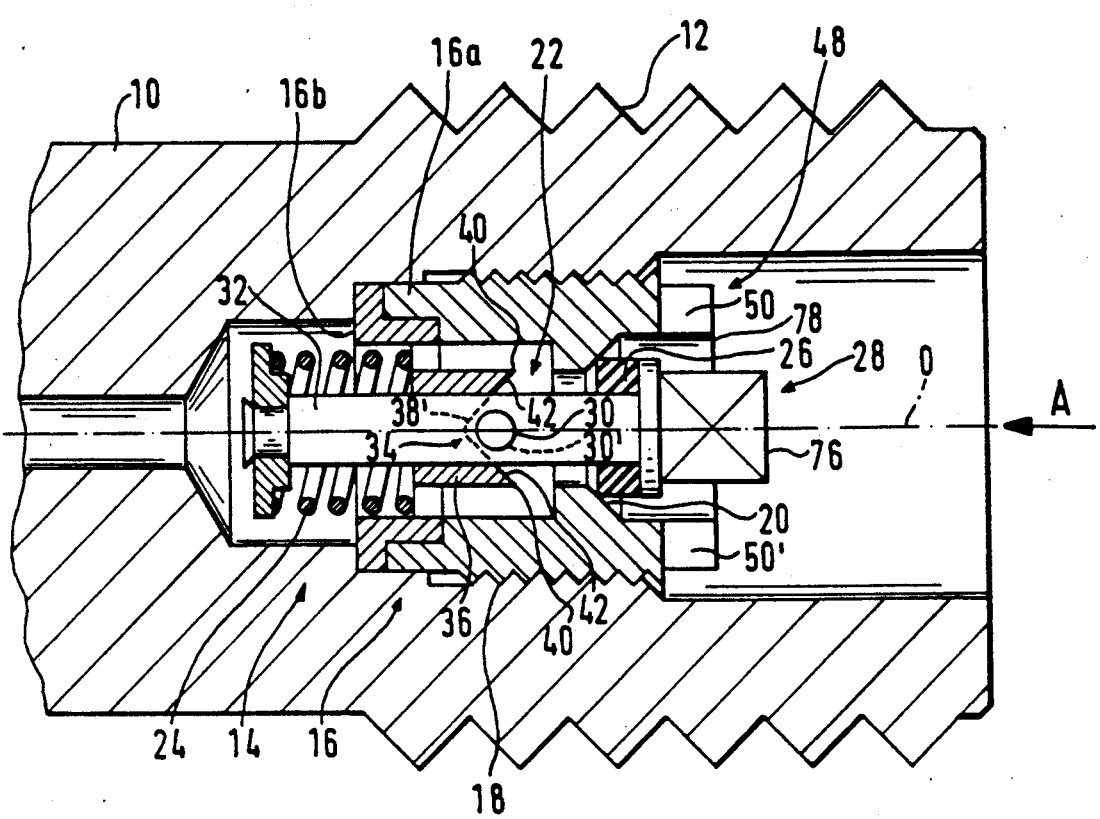
FIG. 1 shows a full section through the residual pressure valve according to the invention in the closed position.

In FIG. 1, 10 is a pipe connection which is associated with a gas container, for example a gas cylinder, (not shown) and has an external thread 12, onto which the filling apparatus according to the invention, described hereinbelow, is screwed (see FIGS. 4 and 5). The residual pressure valve 14 according to the invention is screwed tightly inside this pipe connection 10. This valve 14 consists essentially of a valve body 16 which, for production and assembly reasons, is constructed here in two parts, the valve main body 16a having an external thread 18 and the valve seat 20, and the guide part 16b for the closing part 22 of the valve 14. The closing part 22 is pressed against the valve seat 20 on the valve main body 16a by a pressure spring 24 through the intermediary of a hollow-cylindrical seal 26. The outwardly pointing end, that is to say the end pointing to the right in FIG. 1, of the closing part 22 has a profile which is constructed, in the example shown, as an outer square 28 of rectangular cross-section (see FIGS. 2 and 3). A tool can engage on this square in order to open the valve 14. If the closing part 22 is rotated about its longitudinal axis with the aid of a tool engaging on the square 28, projections 30, 30' on either side of the stem 32 of the closing part 22 move along a cam configuration 34 on the slide bush 36 of the guide part 16b for the valve stem 32. This cam configuration 34 consists essentially of, on either side, one cam base 38, 38' each (38 not visible due to the section), cam vertices 40 and ramps 42, which cam base and cam vertex are connected to one another in each case. In the embodiment shown, as is evident from FIG. 1, the projection of the said cam configuration 34 onto a plane perpendicular to the valve axis 0 is annular. During the said rotation of the square 28, the projections 30, 30', move along the ramps 42 out of the region of the cam base 38 in the direction of the cam vertices 40, as a result of which the closing part 22 lifts off from the valve seat 20 counter to the pressure of the spring 24 and clears the way for the supply of fresh gas.

A main feature of the invention consists in the fact that, on removing the tool (not shown in FIG. 1) for producing a rotational movement of the square 28, the closing part 22 returns to the closed position as a result of the action of the pressure spring 24, as a result of which it is ensured by virtue of the above embodiments that when gas is subsequently removed it is possible to perform this only to a certain limit, which is determined by the force of the pressure spring 24, so that the penetration of impurities into the gas cylinder is prevented.

So as to ensure certain return of the valve closing part 22 onto the valve seat 20 when an exertion of torque on the square 28 ceases, the invention provides various possible arrangements of the cam configuration 34 in conjunction with corresponding rotational angles of the square 28.

A first possibility consists, for example, in the fact that the cam base 38, 38' and the cam vertex 40 form, in a projection onto a plane perpendicular to the axis 0, a central angle, the vertex of which lies on 0, of 90°.

Since the vertices 40 taper virtually to a point, it can be assumed in all probability that when the square 28 is rotated likewise through 90°, in which case the projections 30, 30' thus rest against the tips 40, the square 28 returns, after the torque acting on it has ceased, again to the position shown in FIG. 1, that is to say to the closed position of the valve, in which case it does not matter whether the quarter turn of the stem 32, looking in the direction (FIG. 1), which is necessary for this closing movement is effected to the right or left.

Absolute certainty of an automatic return of the square 28 to its closed position is provided in the two following, a second and third possibility, for the actuation of the square 28 in conjunction with appropriate selection of the magnitude of the abovementioned central angle.

This second possibility is likewise based on the said central angle of 90°, however the square 28 is here rotated through an angle of 90° when opening the valve, so that the projections 30, 30' never travel as far as the vertex 40, by which it is guaranteed as a result of the action of the pressure spring 24 that the closing part 22 again returns to its closed position shown in FIG. 1 when a torque acting on the square 28 from outside is discontinued.

This third possibility is based on the said central angle of 90°, however the square 28 is here rotated, when opening the valve, through an angle which is smaller than this last-mentioned central angle of 90°, for example through approximately 90°. In this case the closing part 22 also returns with certainty to its closed position after a torque exerted on the square 28 has been discontinued.

In this second and third possibility, the stem 32 performs in its closing movement, as a result of the selected cam configuration 34, a clearly defined rotational movement, that is to say either to the right or to the left, in contrast to the said first possibility where the rotational movement can take place optionally either to the right or left.

Figure 2:
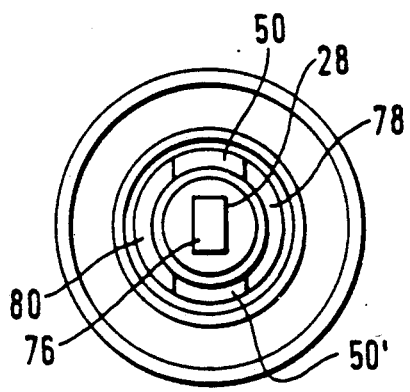
FIG. 2 shows a view in the direction A (FIG. 1) of the residual pressure valve, shown in FIG. 1, in the closed position.
Figure 3:
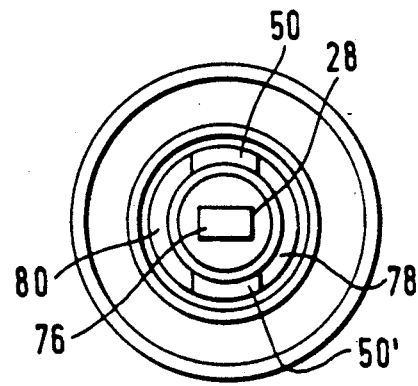
FIG. 3 shows a view as in FIG. 2 but with the residual pressure valve in the open position.

The valve main body 16a is constructed at its outwardly pointing end 48 (in FIG. 1 pointing to the right) in the form of a sleeve 48 having radially pierced transverse grooves 50, 50'. These grooves 50, 50' have, looking in the direction (FIG. 1), the form of annular segments (FIGS. 2 and 3).

Figure 4:
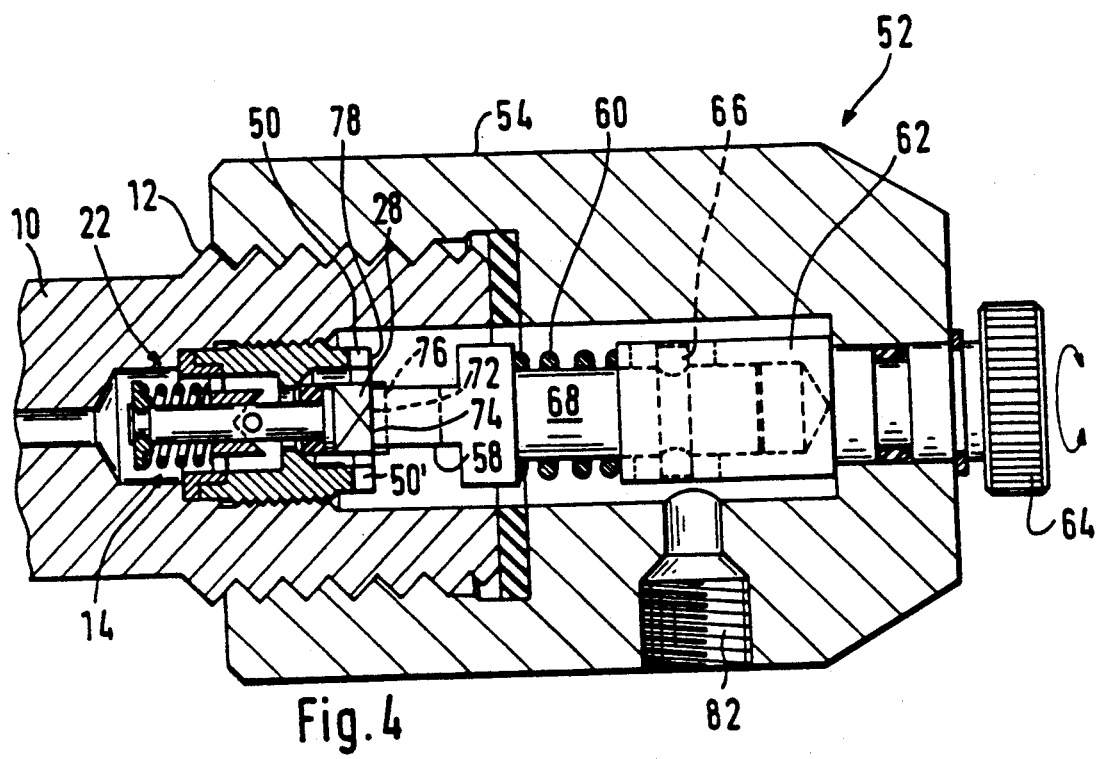
FIG. 4 shows the view of a full section through the residual pressure valve and the filling apparatus according to the invention mounted thereon, with the valve in the closed position.
Figure 5:
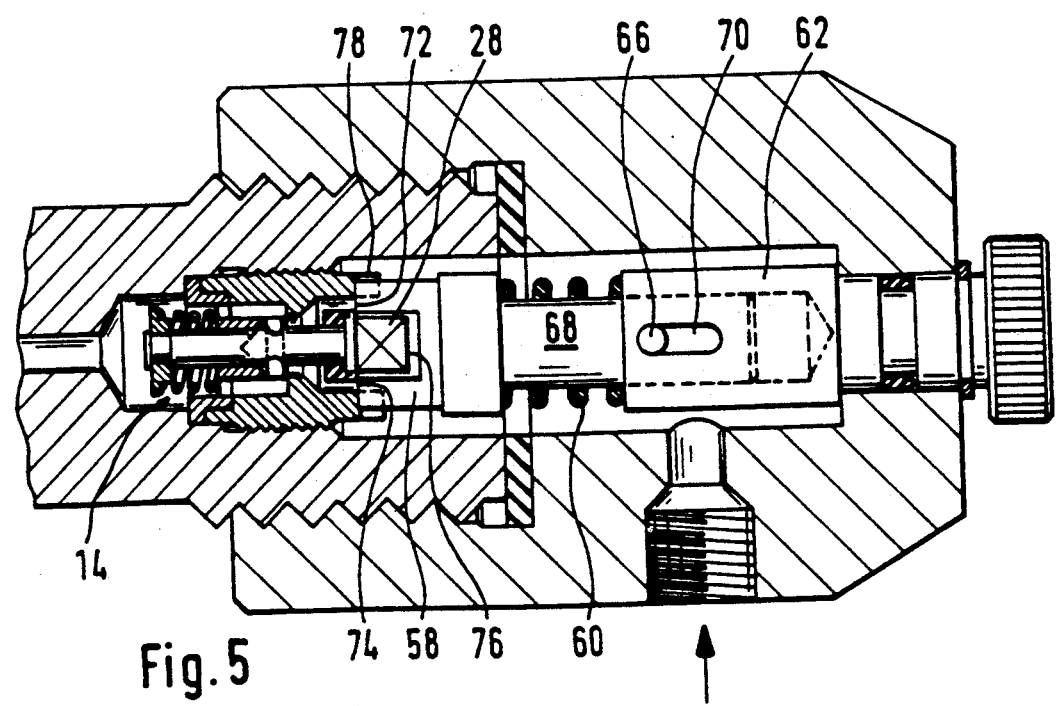
FIG. 5 shows a view as in FIG. 4 but with the residual pressure valve in the open position.

In order that the previously described movements of the closing part 22 according to the invention essentially take place in their relevant phases, without fail and automatically, the invention provides a filling apparatus on the gas cylinder for carrying out a filling process, which filling apparatus is screwed tightly onto the external thread 12 of the pipe connection 10 for the duration of this filling process (FIGS. 4 and 5).

This filling apparatus 52, having the basic form of a union nut 54, is fitted with a rotatable actuating mechanism 56 for the square 28 (or the like) on the closing part 22, it being possible for this actuating mechanism 56 to be turned with the aid of a turning knob 64, or the like.

At the end facing the residual pressure valve 14, the actuating mechanism 56 is designed in the form of a fork 58 (see FIG. 5) which can assume two different positions of engagement with the square 28, due to the presence of the grooves 50, 50', as is explained hereinbelow.

The fork 58 is pretensioned by a pressure spring 60 in the direction of the square 28 and the grooves 50, 50', this pressure spring 60 bearing against the axially fixed part 62 of the actuating mechanism 56. The fork 58 is axially displaceable in the part 62 but is mounted fixedly, in terms of rotation, on the axially fixed part 62 by means of a transverse pin 66 (or the like) on the fork guide stem 68 and an elongated hole 70.

When the union nut-like filling apparatus 52 is screwed onto the threaded 12 of the pipe connection 10 for the purpose of carrying out a filling process in order to fill up the gas cylinder (not shown) again with fresh gas, the pressure spring 60 initially has its greater possible length, which is given by the elongated hole 70. In a specific phase of this screwing-on process, the free (left) front faces 72, 74 of the fork 58 then come into contact with the free (right) front side 76 of the square 28, as a result of which the fork 58 is axially blocked together with its guide stem 68 and, when the filling apparatus 52 is screwed in further, the spring 60 is compressed.

When the filling apparatus 52 has been tightened on the connection 10, the turning handle 64 is actuated until the fork 58 comes into the first phase of the engagement with the square 28, shown in FIG. 4, only the left end of the fork 58 and the right end of the square 28 coming into engagement. It is not yet possible in this position to push the "prongs" of the fork 58 completely over the square 28, since the and faces 72, 74 of the fork are axially blocked by the end faces 78, 80 of the valve main body 16a.

If the fork 58 is now rotated through 90°, starting from the position according to FIG. 4, by actuating the turning knob 64, the residual pressure valve 14 opens as a result of the interaction of the projections 30, 30' and the ramps 42. The fork front faces 72, 74 now come to rest opposite the grooves 50, 50' and are brought into engagement with these grooves as a result of the action of the pressure spring; the fork 58 is thus fixed in this position on the valve main body 16a and the valve 14 blocked in the open position. It is now possible to supply fresh gas to the filling apparatus through the channel 82.

When the filling process has ended, the filling apparatus 52 is unscrewed, as a result of which the fork 58 firstly frees the grooves 50, 50' and immediately thereafter the square 28, so that the residual pressure valve 14 closes automatically under the action of its pressure spring 24 as a result of a simultaneous axial and rotational movement of its closing part 22.

On screwing the filling apparatus 52 onto the connection 10, it may of course happen, purely coincidentally, that the relative (engagement) position shown in FIG. 4 between fork 58 and square 28 results by itself. The actuation of the turning knob 64 is then limited to rotating the fork 58, after fully tightening the filling apparatus 52 on the connection 10, through the said angle of 90°, that is to say a quarter turn, in order to bring about the fork position and valve position according to FIG. 5.

Where reference has been made in the above to a 90° or quarter turn of the closing part 22 of the valve 14, or of the square 28 or fork 58, this information refers of course to the figures shown, which are intended to illustrate as clearly as possible the inventive concept. If an angular value differing from 90° is selected between cam base 34 and cam vertex 40 (see abovementioned second and third possibility), the said rotational angles must of course be adjusted mutatis mutandis, in which case, as emerges from the statements hereinabove, account must be taken only of the fact that the closing part 22, after having been blocked in the open position for the duration of the filling process as a result of the interaction of the fork 58, the square 28 and the grooves 50, 50', moves back to its closed position (FIGS, 1, 2, and 3) automatically, after removal of the filling apparatus 52, as a result of the action of the spring 24 and a combined rotational and axial movement.

As a result of the valve arrangement according to the invention, it is therefore ensured in every case that the residual pressure valve is closed after completion of a filling process and after removal of the filling apparatus according to the invention. This result is achieved using simple, purely mechanical means.

I claim:

1. Valve arrangement for filling and emptying a gas container and in particular a gas container for high-purity gases, said valve arrangement having a residual pressure valve (14) and having a filling apparatus (52) mountable on the residual pressure valve, said pressure valve having a body (16) and having a closing part (22) movable axially in the body, a pressure spring (24) between the valve body and the closing part and urging the closing part toward a closed position, said closing part having a stem (32) with an axis (0), said valve arrangement being characterized in that the valve body and the stem of the closing part have interacting cam means which, under the influence of the pressure spring, produce a stable closed position of the valve stem and, under manual action counter to the influence of the pressure spring, produce an unstable open position of the valve stem, said filling apparatus having manually operable means for actuating the valve stem via the cam means counter to the action of the pressure spring, said manually operable means having a locking device which locks the valve stem in the unstable open position until the filling apparatus is removed from the residual pressure valve.

2. Valve arrangement, according to claim 1, in combination with said gas container and characterized int hat said cam means comprise radial projections (30, 30') on either side of the stem of said closing part and further comprise a cam configuration on said valve body and having, on either side of said valve stem, one cam base (38, 38'), one cam vertex (40) and one ramp (42) which connects the cam base to the cam vertex, the projection of said cam configuration onto a plane perpendicular to the valve stem axis (0) being annular, said projections (30, 30'), in the closed position of the valve stem, being associated with one cam base (38, 38') in each case and, in the open position of the valve stem, with one cam vertex (40) in each case, the valve stem having an outwardly pointing end provided with a first profile for interacting with said manually operable means, the valve body having an outwardly pointing end in the region of said first profile constructed in the form of a sleeve (48) and having a second profile which can likewise interact with said manually operable means, a pipe connection (109) associated with said gas container and threadably receiving said residual pressure valve, said filling apparatus (52) having the basic form of a union nut (54) coaxial with the pressure valve and threaded tightly onto said pipe connection, said manually operable means being mounted on the longitudinal axis of the filling apparatus (52) within the latter and being manually operable from outside the filling apparatus, said manually operable means comprising a first part (62) which is axially fixed but rotatable in the filling apparatus and a second part (68) which is arranged displaceably on said first part (62) but fixed thereto in terms of rotation, said second part (68) having a forked end (58) which can interact both with said first profile and with said second profile, a pressure spring (60) acting between said second part (68) and said first part (62) for pressing said second part in the direction of said pressure valve, said first part (62) being manually rotatable in a first phase until the forked end (58) comes into a first state of engagement with said first profile such that, in a second rotational phase of said first part, said fork (58) carries said first profile along in the direction of rotation, as a result of which the closing part (22) is opened due to the interaction of said projections (30, 30') and said ramps (42), the opening operation being concluded when said fork (58) also comes into engagement with said second profile, as a result of which the said fork (58) is blocked on the valve housing (16) to produce a second state of engagement between the fork (58) and the first profile, the residual pressure valve (14) closing automatically upon removal of the filling apparatus as a result of the valve closing part (22) being pressed back by the action of the closing spring (24) with a combined axial and rotational movement of the stem (32) along the ramps (42) into the region of the cam base (38, 38').

3. Valve arrangement according to claim 2, characterized in that, in said projection, the central angle, with vertex on the valve axis (0), between said cam base (38, 38') and said cam vertex (40) is 90°.

4. Valve arrangement according to claim 2, characterized in that the rotational angle to be performed in order to arrive at the said second state of engagement, starting from the said first state of engagement, is 90°.

5. Valve arrangement according to claim 2, characterized in that the rotational angle to be performed in order to arrive at the said second state of engagement, starting from the said first state of engagement, is less than 90°.

6. Valve arrangement according to claim 2, characterized in that, in the said projection, the central angle, with vertex on the valve axis (0), between said cam base (38, 38') and said cam vertex (40) is greater than 90°.

7. Valve arrangement according to claim 2, characterized in that the said projections (30, 30') are the ends of a transverse pin projecting through the stem (32).

8. Valve arrangement according to claim 2; characterized in that said first profile is a member (28) of essentially rectangular cross-section (76).

9. Valve arrangement according to claim 8, characterized in that the said second profile consists of circular arc-shaped groove segments (50, 50') which are provided on said outwardly pointing end of said sleeve (48).

10. Valve arrangement according to claim 9, characterized in that said member (28) has a greater axial length than the grooves (50, 50') and projects outward axially beyond the latter.

11. Valve arrangement according to claim 10, characterized in that said first state of engagement exists when said fork (58) is in engagement with said member (28), said sleeve (48) having front faces (78), said fork having prongs with front faces (72, 74) which rest against the front faces of said sleeve when said fork is in engagement with said member (28).

12. Valve arrangement according to claim 11, characterized in that said second state of engagement results from said fork (58) being in engagement both with said member (28) and with said grooves (50, 50') on the fixed sleeve (48), by virtue of which the residual pressure valve is blocked in the open position.

* * * * *